Sept. 8, 1953  A. A. ROOT  2,651,118
MOLDING SOLES AND HEELS TO UPPERS
Filed Oct. 27, 1948  3 Sheets-Sheet 1

Inventor
Andrew A. Root
By his Attorney

Sept. 8, 1953          A. A. ROOT          2,651,118
MOLDING SOLES AND HEELS TO UPPERS
Filed Oct. 27, 1948          3 Sheets-Sheet 2
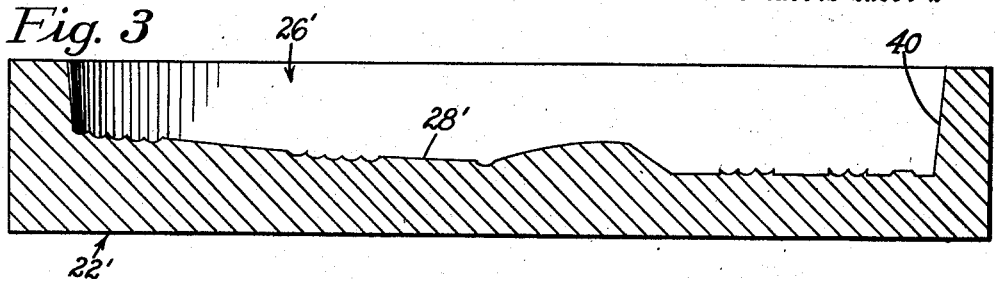
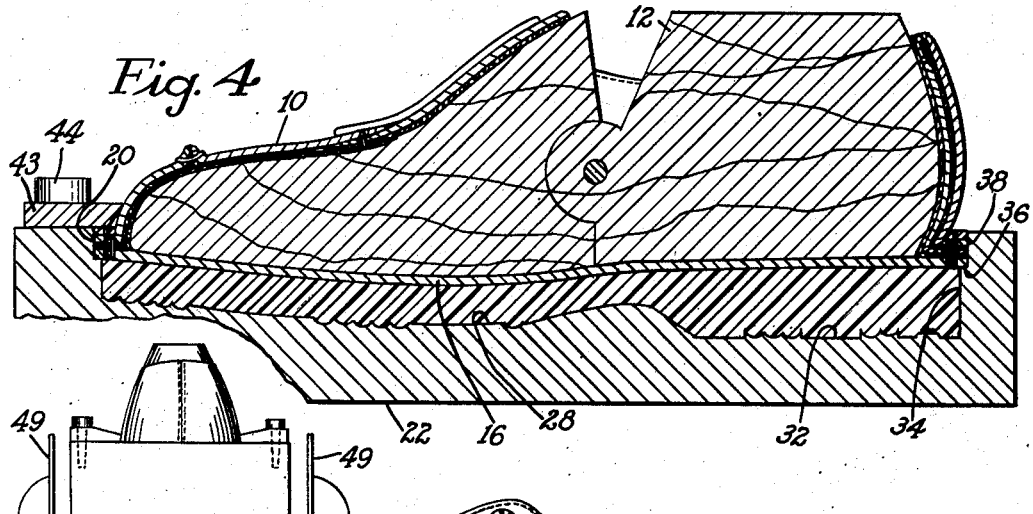
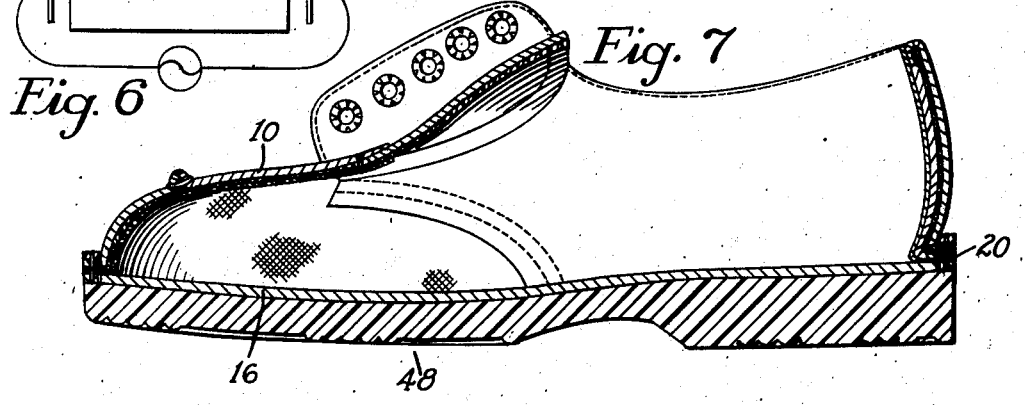
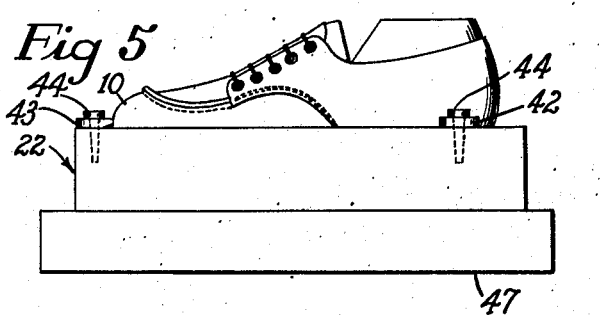
*Inventor*
Andrew A. Root
By his Attorney Sept. 8, 1953 A. A. ROOT 2,651,118
MOLDING SOLES AND HEELS TO UPPERS
Filed Oct. 27, 1948 3 Sheets-Sheet 3

Inventor
Andrew A. Root
By his Attorney

Patented Sept. 8, 1953

2,651,118

UNITED STATES PATENT OFFICE 2,651,118

MOLDING SOLES AND HEELS TO UPPERS

Andrew A. Root, Salem, Mass., assignor to United Shoe Machinery Corporation, Flemington, N. J., a corporation of New Jersey Application October 27, 1948, Serial No. 56,886

6 Claims. (Cl. 36—14)

This invention relates to tread surfaces for articles of footwear and particularly to a pressureless method of forming a sole on a shoe and to a novel shoe.

Methods heretofore proposed for molding a sole on the bottom of a shoe have involved placing "biscuits" or preforms of unvulcanized rubber in a mold, and sealing the shoe firmly against the upper face of the mold to form a molding chamber. The mold and rubber were heated, and the rubber material was conformed to the shape of the mold, bonded to the bottom of the shoe and vulcanized. Substantial pressure was required to cause the rubber material to fill the mold and enter into intimate bonding engagement with the bottom of the shoe. To withstand this pressure, the mold has had to be strong and constructed to close tolerances in order that the joints between the shoe and the mold and the parts of the mold might be capable of retaining the material under the pressure necessary for molding. Also, because of the severe conditions of heat and pressure encountered during molding, the molds have had to be constructed of expensive wear- and corrosion-resistant materials. The expense of the individual molds and the large number of shapes and sizes of molds required to provide a complete shoe line has retarded seriously the molding of soles onto shoes.

It is a feature of the present invention to mold, substantially without pressure, a wear-resistant sole on a shoe using a simple inexpensive mold.

It is a further feature of the present invention to provide an improved shoe having a molded-on sole of a particularly satisfactory tread material.

In accordance with the present invention a tread surface of substantial thickness is molded onto the bottom of an article of footwear such as a shoe by confining between the bottom of the article and a molding surface a body of a fluid dispersion of resin particles in a liquid plasticizer having no substantial solvent action on the resin when cool. The fluid dispersion is then caused to set up to a firm resilient condition wherein it accurately reproduces the configuration of the molding surface and is firmly bonded to the bottom of the article of footwear by heating it to effect at least partial solution of the resin and plasticizer.

The invention will be further described in connection with the accompanying drawings forming part of the present disclosure.

In the drawings,

Fig. 3 is a sectional elevation of an alternate form of sole mold;

Fig. 4 is a sectional elevation of a shoe and shoe mold in sole molding relation with a body of liquid resin dispersion disposed between the bottom of the shoe and the mold;

Fig. 5 is a diagrammatic view of the assembly of a shoe and mold on a hot plate;

Fig. 6 is a diagrammatic view of the assembly of a shoe and mold and a high frequency system for heating and curing the resin dispersion;

Fig. 7 is a sectional elevation of a completed shoe with sole molded thereon;

Figure 1:
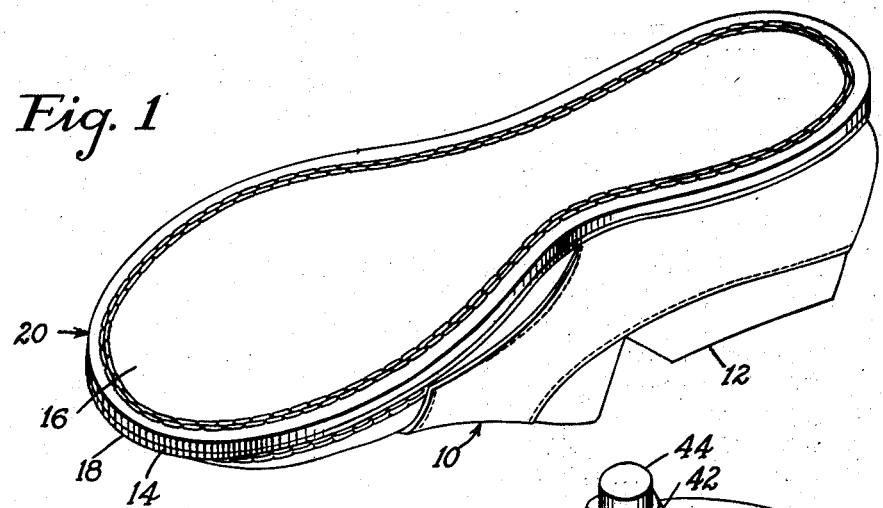
Fig. 1 is a perspective of a shoe mounted on a last.

In practicing the method of the present invention, an article of footwear such as a shoe is prepared and mounted on a suitable form such as a last which will retain it in shaped position for molding of the sole thereon. According to the embodiment of my invention shown in Figs. 1 and 4, a conventional stitchdown shoe 10 to which the outer sole has not been attached is mounted on a last 12. The lower edges 14 of the shoe 10 are flared outward and staple or thread lasted to the insole 16. Welting 18 is applied to the flared edges 14 of the upper; and the welting 18, flared edges 14 and insole 16 are stitched together and provide a flange 20 which is of utility in the molding of soles to the shoe. The term "shoe" as employed in the specification and claims is to be understood in its broad sense as including other articles of footwear such as slippers.

The bottom of the shoe, in this case, the bottom of the insole 16, may then be coated or lightly impregnated with a thin fluid, resinous material, suitably a resin latex. A suitable resin latex is a 54.6% solids polyvinyl chloride latex. Other aqueous dispersions or latices of resins compatible with the resin to be molded on the shoe may be used. When the bottom surface of the shoe has been treated with the resinous material, it is dried if necessary and is then ready for the molding operation. It is found that this coating or impregnating treatment gives a very strong bond between the shoe and a sole molded thereon. It is to be understood, however, that the treatment may be omitted.

Figure 2:
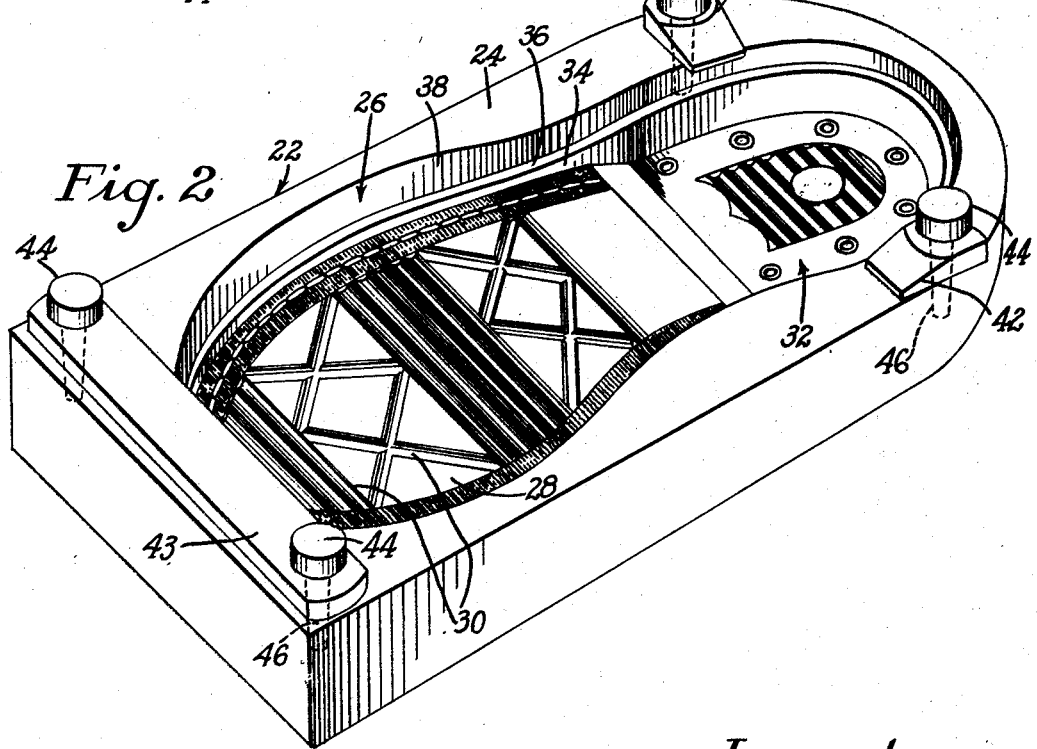
Fig. 2 is a perspective of a sole mold which may be employed in the method of the present invention for the molding of soles to a shoe.

A mold 22 particularly adapted for forming a sole on a shoe having a flange or welt around its bottom edge is illustrated in Fig. 2 and comprises a block 24 of material having a shaped recess 26 therein. The bottom surface 28 of the recess is shaped at its forward portion to form tread bars 30 or other patterns on material molded therein. The rear portion 32 of the recess is depressed below the general level of the forward portion for molding a heel portion integral with the sole. The surface of the rear portion may be formed to provide the same or a different type of tread bars or other pattern desired on the tread portion of the heel. The sides 34 of the recess 26 extend up from the tread portions for a distance corresponding to the desired thickness of the sole to be molded. Soles of any desired thickness, ranging from as little as $\frac{3}{32}$ inch up to any desired value, may be molded by the method of the present invention. The term "substantial thickness" is used herein to describe soles within this range. A ledge 36 extending back away from the recess may be provided at this level to serve as a sealing surface cooperating with the edge portions such as the flange 20 of the bottom of the shoe to form a sealed joint when the shoe is positioned in molding relation with the mold as shown in Fig. 4. Sides 38 may extend up from the outer edge of the ledge 36 to aid in positioning the shoe 10 with relation to the sole surface.

The mold recess 26 is filled with a fluid dispersion of resin particles in a liquid plasticizer. A sufficient quantity of the resin dispersion will be introduced into the mold to completely fill the volume defined by the bottom of the insole, the sides 34 of the recess, and the bottom surfaces 28 and 32 of the recess when the shoe 10 is positioned in molding relation to the mold, as shown in Fig. 4.

Resin dispersions employed in the method and article of the present invention are liquid to pasty mixtures of from 30% to 70% of thermoplastic resin particles in from 70% to 30% of a liquid plasticizer having no substantial solvent action on the resin when cool, but capable of combining physically with the resin particles when the dispersion is heated to form a uniform mass of plasticized resin. The relative proportions of resin and plasticizer selected will depend on the physical properties desired in the final tread surface. For example, high relative proportions of plasticizer will give a softer, more rubbery sole than lower relative proportions within the range.

The particle size of the dispersed resin may vary within relatively wide limits. However, particles of from 275 to 325 microns have been found very satisfactory.

Resin dispersions which have been found particularly satisfactory in the process of the present invention include: a dispersion of particles of a copolymer of vinyl chloride and vinyl acetate containing from 85 to 88% of vinyl chloride in a substantially equal quantity by weight of dioctyl-phthalate; a dispersion of 50 parts of particles of a vinyl chloride, vinyl acetate copolymer containing 85 to 88% of vinyl chloride, in 45 parts of dioctyl-phthalate; and a dispersion of 50 parts of a vinyl chloride, vinyl acetate copolymer, and 49 parts of an ester type plasticizer which may be tri-cresyl phosphate, dibutyl phthalate or di-octyl phthalate. Dispersions of other resins, including polymethyl methacrylate and vinyl chloride-vinylidene chloride copolymers in plasticizers in which they are not substantially soluble in cold condition and in which they are dissolved or gelled when heated, may be employed, provided the resin body obtained on heating the resin dispersion possesses the toughness, hardness and resilience to render it suitable for use as a shoe sole.

It has been found desirable in dispersions of the type employed to use about 1% of strontium naphthenate.

Limited amounts of fillers may be incorporated in the dispersion prior to molding. Fillers which have been employed include fibers of copolymerized vinyl chloride and vinyl acetate, sisal fiber, diatomaceous earth and clay. Other fillers may be used. The percentage of fillers will depend on the stiffness, strength, or other property desired.

The dispersion may also include any compatible dye or pigment or combination of these. Where pigment is used it may first be ground into the plasticizer.

When the mold recess 26 is filled with the resin dispersion, the shoe 10 is positioned with its bottom portion 16 in contact with the dispersion and is held against displacement by means of latch members 42 and a bar 43 which are mounted on the pins 44 in holes 46 in the upper surface of the mold. The latch members 42 may be turned to engage the upper surface of the welt 18 to hold the shoe in place during treatment, and turned out of engagement with the welt when the shoe is to be removed.

The assembly of shoe 10 and mold 22 containing the resin dispersion is subjected to heating to convert the resin dispersion to solid condition. The heating may be effected in various ways, such as placing the assembly on a hot plate 47 as shown in Fig. 5, and maintaining it there for a period of from 5 to 20 minutes after the resin dispersion has reached a temperature sufficient to cause solution and/or gelling of the resin by the plasticizer, e. g., a temperature of from 270° to 325° C. with the vinyl chloride, vinyl acetate copolymer dispersions referred to above. It has also been found that satisfactory heating may be obtained by the action of a high-frequency electric field acting on the dispersion. This field may be created between electrodes 49 positioned on opposite sides of a lasted shoe as shown diagrammatically in Fig. 6. Equivalent high-frequency electric heating systems are known and may be used. In a high-frequency field of 1800 volts and a frequency of from 20 to 40 megacycles satisfactory heating has been obtained in as short a period as one minute. Also the entire assembly may be placed in a heating chamber and maintained there for a period of from 5 to 20 minutes after the dispersion has reached a temperature sufficient to cause it to set up.

After the heat treatment the latch members 42 are turned to release the shoe, and the shoe is lifted from the mold. The edges of the sole 48 and flange 20 are then trimmed.

The resulting shoe (see Fig. 7) possesses excellent flexibility and resistance to wear and at the same time is quite inexpensive because of the simplicity of the operations required to form the sole thereon.

The one-piece mold 22 referred to in the above description of the process is simple to construct since it may be formed by casting plaster and/or resin around a finished shoe including a sole, hardening the material, and removing the shoe therefrom. A suitable mold composition may comprise plaster of Paris strengthened by inclusion in the wet mixture of commercially available aldehyde resins recommended for strengthening the plaster such as a two part resin material. This material is mixed with plaster of Paris according to the manufacturer's instructions and adds toughness and strength to the cast mold.

An alternate form of mold 22' shown in Fig. 3 comprises a recess 26' having a similar bottom surface 28' but having sides 40 extending upwardly and slightly outwardly from the bottom surface 28'. When a shoe 10 is inserted in this mold, the edges of the flange 20 around the bottom of the shoe engage the sloping sides 40 of the mold to form a sealed joint.

Figure 8:
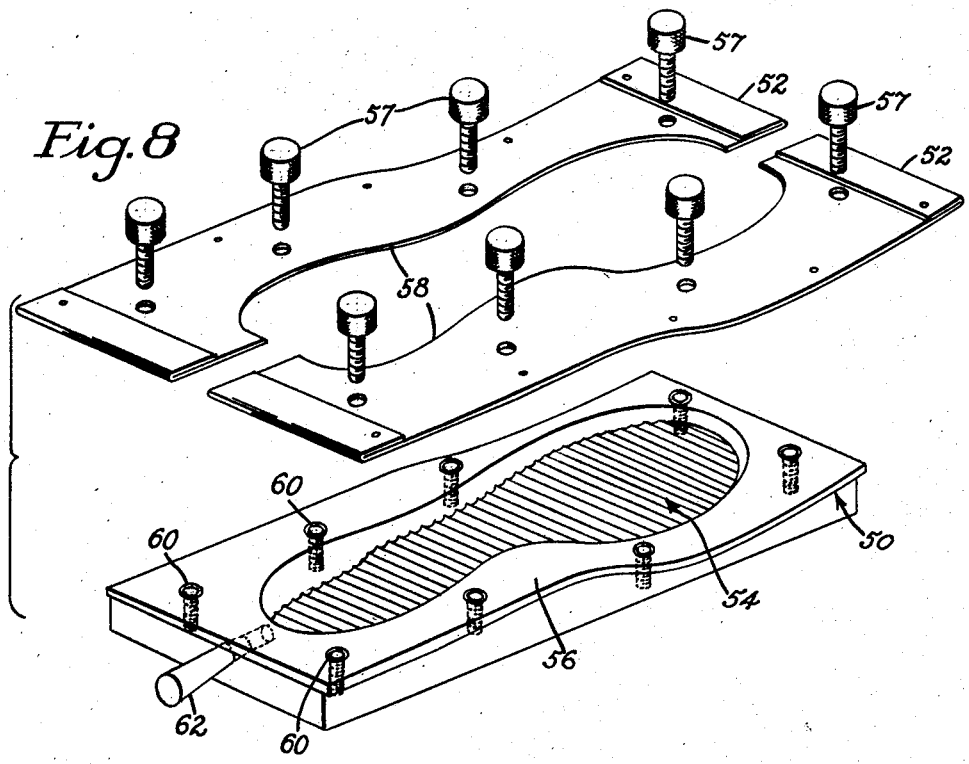
Fig. 8 is an exploded perspective of a mold and rim members employed in conjunction with the mold to improve the joint between the shoe and the sole mold when assembled in the process of molding a sole.

For certain types of shoes such as a McKay type where no welt or other flange is present there may be employed a mold 50 equipped with rim members 52 (see Fig. 8). As there shown, the mold may be formed of metal and provides a recess 54 shaped to form a heel and sole with a desired tread surface thereon. The upper face 56 of the mold 50 is contoured to correspond to the feather line of a shoe on which a sole is to be molded.

Rim members 52 of flexible metal rest on the contoured upper surface 56 of the mold and are secured in place by bolts 57 mounted in the threaded holes 60. The inner edges 58 of the rim members are shaped to engage the shoe at the feather line to prevent escape of resin dispersion from the space beneath the bottom of the shoe and also to give a neat appearing juncture between a sole of resinous material and the shoe on which it is molded. The procedure to form a sole on a shoe with this apparatus is substantially the same as that employed with the one-piece mold. However, because of the rim member, it has been found desirable to assemble the mold 50, rim members 52 and a shoe and to introduce the resin dispersion into the space between the bottom of the shoe and the rim member and mold surfaces through a conduit 62 disposed in the heel portion of the mold. The assembly is then heated, for example, by placing the assembly on a hot plate, to cause the dispersion to solidify. The assembly may be cooled, the rim members 52 removed, and the shoe with the sole molded thereon is removed from the mold.

The mold 50 may be employed for forming soles on welt, stitchdown or other uppers without the rim members 52 where the uppers are supported with their feather lines in correct relation to the upper surface 56 of the mold. Any convenient support may be used. For example, stitchdown or other shoes having a flange around the base may be placed with the bottom of the flange resting on the surface 56.

The process of the present invention is extremely flexible and lends itself to the manufacture of widely varied types of shoes. Thus, soles and/or heels may be molded on shoes of any type including welt, stitchdown, McKay, prewelt, slip lasted, Littleway or other shoe construction, and may be formed on fabric footwear such as slippers or even on socks. Also tread surfaces such as soles and/or heels may be molded on worn shoes to replace the conventional shoe repairing operations. In repair work, the remaining sole or heel surface may be roughened as by wire brush or sandpaper prior to molding on the sole and/or heel and may be removed and a sole molded on as herein described. The resin dispersion is fluid and enters readily into all portions of even the most complicated mold designs. Also the pressureless character of the molding operation simplifies operating procedure as well as mold design so that many variations may be introduced into the process. For example, mechanical inserts may be employed without complicated arrangements for retaining them in position as might be required in pressure molding operations.

Figure 9:
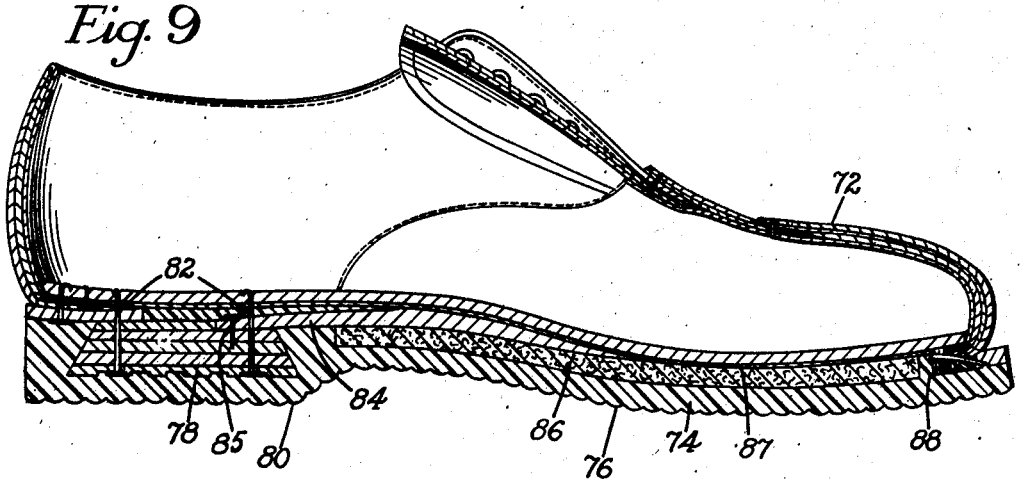
Fig. 9 is an elevation of a modified form of shoe which may be manufactured in accordance with the present invention.

A modified shoe construction shown in Fig. 9 which may be made according to the present invention comprises a welt type shoe 72 and a resin sole 74 molded thereon having fibrous material inserts arranged within the body of resin forming the sole in spaced relation to the tread surface 76. These inserts may be incorporated by attaching them by any convenient means such as tacks, nails or adhesive to the bottom surface of an inner sole such as the insole of a welt type shoe or a sock lining of a slip-lasted shoe and carrying out molding operations, for example as described in connection with Figs. 1 and 4. In the illustrated shoe there is provided a laminated wood insert 78 secured to the heel portion 80 by nails 82. This insert serves to give lightness and rigidity to the heel portion while at the same time reducing the quantity of resin required. A wooden shank stiffener 84 with one end secured by a tack 85 to the wooden insert 78 extends forwardly to provide stiffness and strength in the shank portion of the shoe. Felted material, such as a sheet of wool felt 86, is adhesively secured to the bottom 87 of the shoe with its rearmost portion at approximately the juncture between the raised heel portion 80, and its forward portion adjacent the insole rib 88. The side edges of the felt sheet 86 extend at either side substantially to the insole rib 88 so that in the finished shoe there is provided a cushion of felted material between the insole 87 and the resinous sole 74. It has been found that because the felted material is much more readily compressible than the resinous material, shoes comprising the felt insert are substantially more flexible than shoes containing a solid, molded resin sole. Also, because the cross section of resinous material is less, the stretching effect on the tread surface of the sole is substantially less than in the solid sole when the shoe is flexed during walking. The felt material is capable of taking up moisture from the foot of the wearer and adds to the comfort of the shoe.

It has been found that the strength and toughness of the tread surface of a molded resin sole may be further strengthened and the wearing properties improved by subjecting the surface to a heat treatment after completion of the shoe. This treatment involves surface heating of the tread surface. Suitable means for effecting surface heating involves subjecting the sole to the effect of infrared lamps for a time, e. g., 5 to 15 minutes, sufficient to raise the surface from 250° to 500° F. and then subjecting the surface to an air blast heated to a temperature of around 400° to 600° F. for from 30 seconds to 2 minutes. A surface so treated presents, after cooling, a glossy appearance and may be firmer and tougher to distorting or abrading factors than are untreated resin soles.

Having thus described my invention, what I claim as new and desire to secure by Letters Patent of the United States is:

1. In shoemaking, the method of providing a resilient tread member of substantial thickness which comprises confining a body of a fluid dispersion of resin particles in a liquid plasticizer within the space between a bottom surface of a shoe and a tread molding surface and heating the confined body of dispersion to convert it to a solid resilient condition, said confined body of dispersion being fluid when cool prior to said heating, said plasticizer having no substantial action on said resin particles when cool but being capable of dissolving the resin particles at least partially at higher temperatures, and said heating raising the temperature of said plasticizer to cause at least partial solution of the resin particles in the plasticizer to convert the dispersion into a solid resilient body of plasticized resin adhering firmly to the bottom of the shoe.

2. In shoemaking, the method of providing a molded tread member of substantial thickness on a shoe which comprises disposing on the bottom of the shoe a body of readily compressible felted fibrous material with its surfaces terminating in spaced relation to the surfaces of the tread member to be formed on the shoe, confining between the surfaces of the shoe bottom and of the felted fibrous material and a tread molding surface a body of a fluid dispersion of resin particles in a liquid plasticizer and heating the confined body of dispersion to convert it into a solid resilient body of plasticized resin, said confined body of dispersion being fluid when cool prior to said heating, said plasticizer having no substantial solvent action on said resin particles but being capable of dissolving said resin particles at least partially when at higher temperature and said heating raising the temperature of said plasticizer to cause at least partial solution of the resin particles in the plasticizer to convert the dispersion into a solid resilient body of plasticized resin reproducing the molding surface and adhering firmly to the bottom of the shoe and to the felted fibrous material.

3. In shoemaking, the method of providing a molded tread member of substantial thickness on a shoe which comprises depositing resin on and in the bottom surfaces of the shoe, confining between the bottom surface of the shoe and a tread molding surface a body of a fluid dispersion of resin particles in a liquid plasticizer and heating the confined body of dispersion to convert it to a body of solid resilient plasticized resin, said confined body of dispersion being fluid when cool prior to said heating, said plasticizer having no substantial solvent action on said resin particles when cool but being capable of dissolving the resin particles at least partially when at higher temperature, and said heating raising the temperature of said plasticizer to cause at least partial solution of the resin particles in the plasticizer to convert them to a solid resilient body of plasticized resin reproducing the molding surface and adhering firmly to the bottom of the shoe.

4. In shoemaking, the method of providing a molded tread member of substantial thickness on a shoe bottom which comprises coating the bottom surface of said shoe with an aqueous dispersion of a resin, removing moisture from said coating, disposing on the bottom surface of the shoe a body of readily compressible felted fibrous material, the surfaces of said body of felted fibrous material terminating in spaced relation to the surfaces of the tread member to be molded on the shoe, confining between the bottom surfaces of the shoe and of the felted fibrous material and a tread molding surface a body of a fluid dispersion of resin particles in a liquid plasticizer and heating the confined body of dispersion to convert the dispersion to a solid resilient body of plasticized resin, said confined body of dispersion being fluid when cool prior to said heating, said plasticizer having no substantial solvent on said resin particles when cool but being capable when at higher temperature of at least partially dissolving said resin particles, and said heating raising the temperature of said plasticizer to cause at least partial solution of the resin particles in the plasticizer to convert them into a solid resilient body of plasticized resin reproducing the molding surface and adhering firmly to the bottom of the shoe and to the felted fibrous material.

5. In shoemaking, the method of providing a molded tread member of substantial thickness on a shoe bottom which comprises coating the bottom surface of said shoe with an aqueous dispersion of a resin, removing moisture from said coating, disposing on the bottom surface of the shoe a body of readily compressible felted fibrous material, the surfaces of said body of felted fibrous material terminating in spaced relation to the surfaces of the tread member to be molded on said shoe, confining between the bottom surfaces of the shoe and of the felted fibrous material and a tread molding surface a body of a fluid dispersion of thermoplastic resin particles composed of vinyl chloride vinyl acetate copolymer resin containing from 85% to 88% of vinyl chloride in a liquid ester plasticizer and heating the confined body of disperson to convert it to a solid resilient body of plasticized resin, said plasticizer having no substantial solvent action on said resin particles when cool but being capable at higher temperatures of at least partially dissolving the resin particles, the resin and plasticizer being present in the proportions of from 30 to 70 parts of resin to from 70 to 30 parts of plasticizer, and said heating raising the temperature of said plasticizer to cause at least partial solution of the resin particles in the plasticizer to convert them to a solid resilient body of plasticized resin reproducing the molding surface and adhering firmly to the bottom of the shoe and to the felted fibrous material.

6. A shoe comprising a shoe upper, an insole, a body of readily compressible felted fibrous material adjacent said insole, and a solid resilient tread member of plasticized resin formed in situ from a liquid dispersion of particles of a vinyl copolymer resin in a liquid ester plasticizer, the plasticizer having no substantial action on particles of said resin when cool but being capable at higher temperatures of at least partially dissolving the resin particles, said resin tread member being in continuous engagement with the edges and bottom surfaces of said felted fibrous body and with said insole and conforming to the contours of said felted fibrous body and adhering to said felted fibrous body and to the bottom of the insole.

ANDREW A. ROOT.

References Cited in the file of this patent

UNITED STATES PATENTS

| Number | Name | Date |
|---|---|---|
| 616,470 | Kennedy | Dec. 27, 1898 |
| 848,807 | Clark | Apr. 2, 1907 |
| 927,287 | Saunders | July 6, 1909 |
| 1,111,437 | Butterfield | Sept. 22, 1914 |

(Other references on following page)

UNITED STATES PATENTS

| Number | Name | Date |
|---|---|---|
| 1,215,450 | White | Feb. 13, 1917 |
| 1,989,853 | Finn | Feb. 5, 1935 |
| 2,040,921 | Corbin, Jr. | May 19, 1936 |
| 2,087,480 | Pitman | July 20, 1937 |
| 2,129,106 | Szerenyi et al. | Sept. 6, 1938 |
| 2,234,993 | Vernon et al. | Mar. 18, 1941 |
| 2,283,688 | Mergier et al. | May 19, 1942 |
| 2,284,335 | Meyer | May 26, 1942 |
| 2,297,248 | Rudolph | Sept. 29, 1942 |
| 2,302,167 | Austin | Nov. 17, 1942 |
| 2,321,131 | Crandell | June 8, 1943 |
| 2,322,903 | Wilkoff | June 29, 1943 |
| 2,323,562 | Nugent | July 9, 1943 |
| 2,342,846 | Crandell | Feb. 29, 1944 |
| 2,350,852 | Wehr | June 6, 1944 |
| 2,377,421 | Hindes | June 5, 1945 |
| 2,447,512 | Leahy | Aug. 24, 1948 |
| 2,470,089 | Booth | May 17, 1949 |
| 2,474,801 | Owen | June 28, 1949 |
| 2,481,389 | Campagna | Sept. 6, 1949 |
| 2,500,937 | Earl | Mar. 21, 1950 |

FOREIGN PATENTS

| Number | Country | Date |
|---|---|---|
| 500,298 | Great Britain | Feb. 7, 1939 |

OTHER REFERENCES

Official Digest No. 263, December 1946, 696–702.